(12) United States Patent
Chu (10) Patent No.: US 9,602,261 B2
(45) Date of Patent: Mar. 21, 2017

(54) METHOD OF INDICATING PHYSICAL UPLINK CONTROL CHANNEL RESOURCE IN ENHANCED MULTIPLE-INPUT MULTIPLE-OUTPUT TECHNOLOGY AND RELATED COMMUNICATION DEVICE

(71) Applicant: HTC Corporation, Taoyuan County (TW)

(72) Inventor: Feng-Seng Chu, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/183,474

(22) Filed: Feb. 18, 2014

(65) Prior Publication Data

US 2014/0233477 A1 Aug. 21, 2014

Related U.S. Application Data

(60) Provisional application No. 61/766,083, filed on Feb. 18, 2013.

(51) Int. Cl.
*H04L 5/00* (2006.01)

(52) U.S. Cl.
CPC .......... *H04L 5/0053* (2013.01); *H04L 5/0055* (2013.01); *H04L 5/0091* (2013.01)

(58) Field of Classification Search
CPC ..... H04L 5/0055; H04L 5/001; H04L 1/1861; H04L 5/0053; H04L 5/0048; H04L 1/1671; H04L 1/0026; H04L 1/18; H04L 1/0031; H04L 5/0057; H04L 5/0035; H04L 1/1854; H04W 72/0413; H04W 72/04; H04W 72/0406; H04W 24/10; H04W 24/02; H04W 28/06

See application file for complete search history.

(56) References Cited

U.S. PATENT DOCUMENTS

| | | | |
|---|---|---|---|
| 2012/0046032 A1* | 2/2012 | Baldemair et al. | 455/434 |
| 2012/0076088 A1* | 3/2012 | Hwang | H04W 72/1289 370/329 |
| 2014/0286296 A1* | 9/2014 | Tiirola | H04L 5/001 370/329 |
| 2014/0376424 A1* | 12/2014 | Seo et al. | 370/280 |

OTHER PUBLICATIONS

3GPP TS 36.211, v10.5.0, Jun. 2012.

* cited by examiner

*Primary Examiner* — Curtis A Alia
(74) *Attorney, Agent, or Firm* — Winston Hsu; Scott Margo (57) ABSTRACT

A method of indicating a physical uplink control channel (PUCCH) resource for a user equipment (UE) of a wireless communication system includes receiving a resource index denoting PUCCH format 2 resources and PUCCH format 3 resources, instead of merely denoting PUCCH format 2 resources, from a network of the wireless communication system; and determining resources for a transmission of control information over PUCCH format 2 or PUCCH format 3 based on an operation of the received resource index.

18 Claims, 5 Drawing Sheets

METHOD OF INDICATING PHYSICAL UPLINK CONTROL CHANNEL RESOURCE IN ENHANCED MULTIPLE-INPUT MULTIPLE-OUTPUT TECHNOLOGY AND RELATED COMMUNICATION DEVICE

CROSS REFERENCE TO RELATED APPLICATIONS

This application claims the benefit of U.S. Provisional Application No. 61/766,083, filed on Feb. 18, 2013 and entitled "Method and Apparatus to indicate PUCCH resource in Enhanced MIMO", the contents of which are incorporated herein in their entirety.

BACKGROUND OF THE INVENTION

1. Field of the Invention

The present invention relates to a method used in a wireless communication system and related communication device, and more particularly, to a method of indicating physical uplink control channel (PUCCH) resources for a transmission of control information in a wireless communication system and related communication device.

2. Description of the Prior Art

A long-term evolution (LTE) system supporting the 3GPP Rel-8 standard and/or the 3GPP Rel-9 standard has been developed by the 3rd Generation Partnership Project (3GPP) as a successor of a universal mobile telecommunications system (UMTS), for further enhancing performance of the UMTS to satisfy increasing needs of users. The LTE system includes a new radio interface and a new radio network architecture that provides a high data rate, low latency, packet optimization, and improved system capacity and coverage. In the LTE system, a radio access network known as an evolved universal terrestrial radio access network (E-UTRAN) includes multiple evolved Node-Bs (eNBs) for communicating with multiple user equipments (UEs), and communicates with a core network including a mobility management entity (MME), a serving gateway, etc., for Non Access Stratum (NAS) control.

An LTE-advanced (LTE-A) system, as its name implies, is an evolution of the LTE system. The LTE-A system targets faster switching between power states, improves performance at the coverage edge of an eNB, and includes advanced techniques, such as carrier aggregation (CA), coordinated multipoint (COMP) transmission/reception, uplink (UL) multiple-input multiple-output (MIMO), etc. For a user equipment and an eNB to communicate with each other in the LTE-A system, the user equipment and the eNB must support standards developed for the LTE-A system, such as the 3GPP Rel-10 standard or later versions.

The 3GPP spec has defined the physical uplink control channel (PUCCH) with several formats, as shown in Table 1, for transmissions of certain control information.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

In the prior art such as the 3GPP Rel-11 or before, a resource index $n_{PUCCH}^{(2,\tilde{p})}$ identifies resources used for transmission of hybrid automatic repeat request (HARQ) feedbacks and channel state information (CSI) reports over PUCCH formats 2/2a/2b in a wireless communication system supporting a MIMO technology. From the resource index $n_{PUCCH}^{(2,\tilde{p})}$ all resources including frequency band (i.e. resource block) and cyclic shift for transmissions over PUCCH format 2 can be derived. The range of the resource index $n_{PUCCH}^{(2,\tilde{p})}$ is indicated in 3GPP TS 36.331 Rel-11 as follows:

```
CQI-ReportPeriodic-r10 ::=    CHOICE {
    release                       NULL,
    setup                         SEQUENCE {
        cqi-PUCCH-ResourceIndex-r10        INTEGER (0..1184),
        cqi-PUCCH-ResourceIndexP1-r10      INTEGER (0..1184)    OPTIONAL, -- Need OR
        cqi-pmi-ConfigIndex                INTEGER (0..1023),
        cqi-FormatIndicatorPeriodic-r10    CHOICE {
```

In such a situation, the range of the resource index $n_{PUCCH}^{(2,\tilde{p})}$ is from 0 to 1184.

However, for an enhanced MIMO technology which features finer spatial and frequency granularity, additional channel state information (CSI) reports providing sub-band channel quality indicator (CQI), sub-band precoding matrix indicator (PMI), etc. are required. In such a situation, the UE needs to transmit more bits for the CSI reports. Thus, utilizing PUCCH format 2 for transmission of HARQ feedbacks and CSI reports may be insufficient.

On the other hand, a resource index $n_{PUCCH}^{(3,\tilde{p})}$ identifies resources used for transmission of HARQ feedbacks over PUCCH format 3 for a wireless communication system supporting a CA technology, where the UE is configured multiple cells. The range of the resource index $n_{PUCCH}^{(3,\tilde{p})}$ is indicated in 3GPP TS 36.331 Rel-11 as follows:

```
PUCCH-ConfigDedicated-v1020 : :=   SEQUENCE {
  pucch-Format-r10                       CHOICE {
    format3-r10                                   SEQUENCE {
      n3PUCCH-AN-List-r10 SEQUENCE (SIZE (1..4)) OF INTEGER (0..549)        OPTIONAL, -- Need ON
      twoAntennaPortActivatedPUCCH-Format3-r10    CHOICE {
        release                                   NULL,
        setup                                     SEQUENCE {
          n3PUCCH-AN-ListP1-r10         SEQUENCE (SIZE (1..4)) OF INTEGER (0..549)
        }
      }                                                          OPTIONAL -- Need ON
    },
    channelSelection-r10                 SEQUENCE {
      n1PUCCH-AN-CS-r10                           CHOICE {
        release                                   NULL,
        setup                                     SEQUENCE {
          n1PUCCH-AN-CS-List-r10        SEQUENCE (SIZE (1..2)) OF N1PUCCH-AN-CS-r10
        }
      }                                                          OPTIONAL -- Need ON
    }
  }                                                              OPTIONAL, -- Need OR
  twoAntennaPortActivatedPUCCH-Format1a1b-r10     ENUMERATED {true}    OPTIONAL,-- Need OR
  simultaneousPUCCH-PUSCH-r10                     ENUMERATED {true}    OPTIONAL,-- Need OR
  n1PUCCH-AN-RepP1-r10                            INTEGER (0..2047)        OPTIONAL -- Need OR
}
```

In such a situation, the range of the resource index $n_{PUCCH}^{(3,\tilde{p})}$ is from 0 to 549.

However, if the UE is configured one cell, PUCCH format 3 is not used for transmission, and thus no signalling for PUCCH format 3 is received from the serving base station.

Therefore, how to indicate PUCCH resources for a UE of a wireless communication system supporting an enhanced MIMO technology without changing the 3GPP spec too much is a topic to be addressed and discussed in the industry.

SUMMARY OF THE INVENTION

The present invention aims to provide a method of indicating physical uplink control channel (PUCCH) resources for transmission over PUCCH format 3 when the UE is configured one cell. The method and related communication device of the present invention enable transmitting more bits of CSI reports on PUCCH resources, so as to accommodate a wireless communication system featuring finer spatial and frequency granularity such as an enhanced MIMO system.

The present invention discloses a method of indicating physical uplink control channel (PUCCH) resources for a user equipment (UE) of a wireless communication system, wherein the UE is configured one cell. The method includes receiving a resource index denoting PUCCH format 2 resources and PUCCH format 3 resources, instead of merely denoting PUCCH format 2 resources, from a network of the wireless communication system; and determining resources for a transmission of control information over PUCCH format 2 or PUCCH format 3 based on an operation of the received resource index.

The present invention further discloses a method of indicating physical uplink control channel (PUCCH) resources for a user equipment (UE) of a wireless communication system, wherein the UE is configured one cell. The method includes receiving a resource index denoting PUCCH format 3 resources from a network of the wireless communication system when the UE is configured one cell.

The present invention further discloses a communication device of indicating physical uplink control channel (PUCCH) resources in a wireless communication system, wherein the communication device is configured one cell. The communication device includes a processing means; a storage unit; and a program code stored in the storage unit, wherein the program code instructs the processing unit to execute the steps of receiving a resource index denoting PUCCH format 2 resources and PUCCH format 3 resources, instead of merely denoting PUCCH format 2 resources, from a network of the wireless communication system; and determining resources for a transmission of control information over PUCCH format 2 or PUCCH format 3 based on an operation of the received resource index.

The present invention further discloses a communication device of indicating physical uplink control channel (PUCCH) resources in a wireless communication system, wherein the communication device is configured one cell. The communication device includes a processing means; a storage unit; and a program code stored in the storage unit, wherein the program code instructs the processing unit to execute the steps of receiving a resource index denoting PUCCH format 3 resources from a network of the wireless communication system when the communication device is configured one cell.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
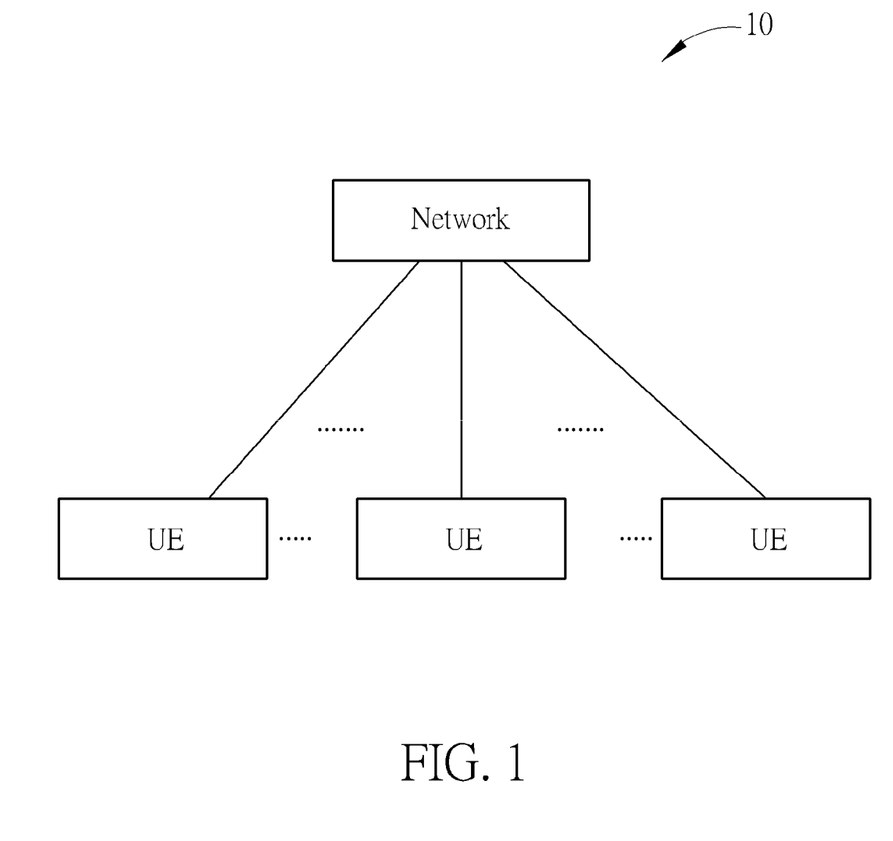
FIG. 1 is a schematic diagram of a wireless communication system according to an example of the present invention.

Please refer to FIG. 1, which illustrates a schematic diagram of a wireless communication system 10 according to an example of the present disclosure. The wireless communication system 10, such as a long term evolution-advanced (LTE-A) system or other mobile communication systems, is briefly composed of a network and a plurality of user equipments (UEs). In FIG. 1, the network and the UEs are simply utilized for illustrating the structure of the wireless communication system 10. Practically, the network can be referred as to an E-UTRAN (evolved-UTAN) comprising a plurality of evolved Node-Bs (eNBs) and relays in the LTE-A system. The UEs can be mobile devices such as mobile phones, laptops, tablet computers, electronic books, and portable computer systems. Besides, the network and the UE can be regarded as a transmitter or receiver depending on the transmission direction, e.g., for an uplink (UL), the UE is the transmitter and the network is the receiver, and for a downlink (DL), the network is the transmitter and the UE is the receiver.

Figure 2:
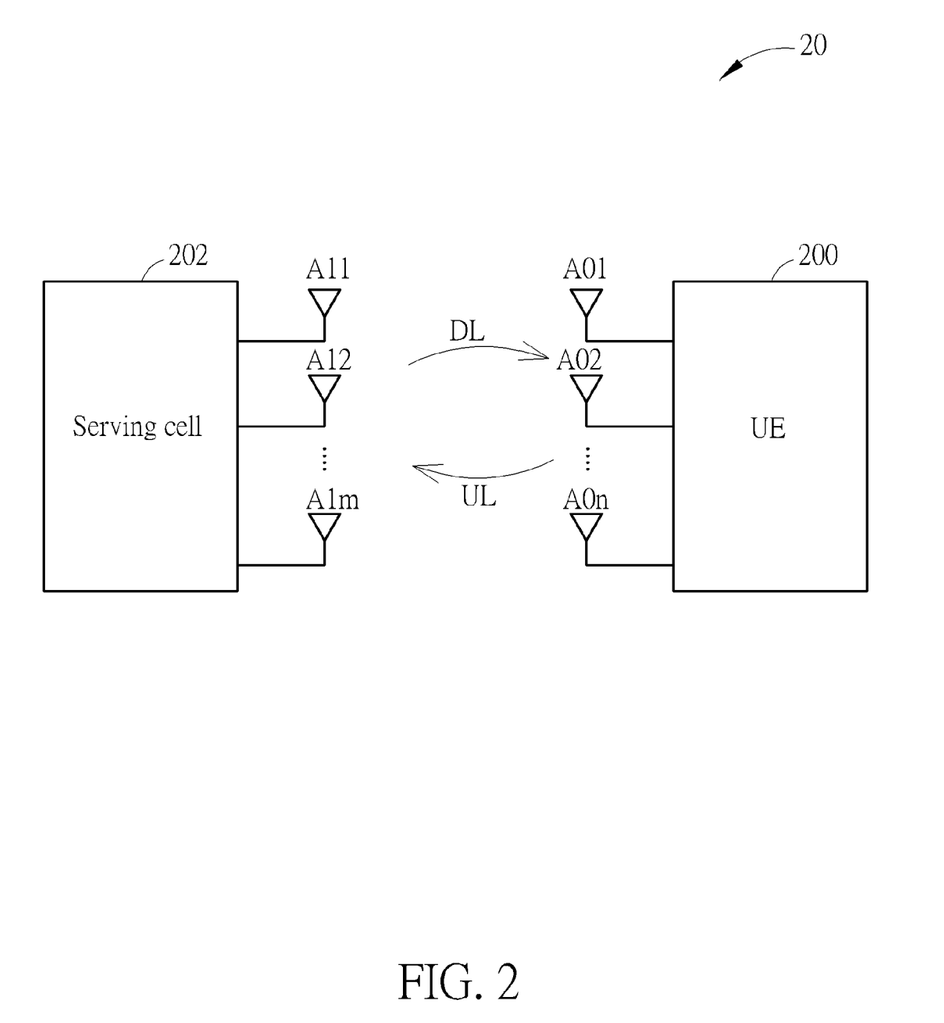
FIG. 2 is a schematic diagram of a MIMO system according to an example of the present invention.

In an example, the wireless communication system may support an enhanced Multiple-Input Multiple-Output (MIMO) technology, which features finer spatial and frequency granularity. As shown in FIG. 2, the UE 200 has a radio connection with the serving cell 202 of the network in the wireless communication system 20. The UE 200 and the serving cell 202 have multiple antennas A01-A0n, A11-A1n, respectively, to enhance the data capacity between the UE 200 and the serving cell 202.

Figure 3:
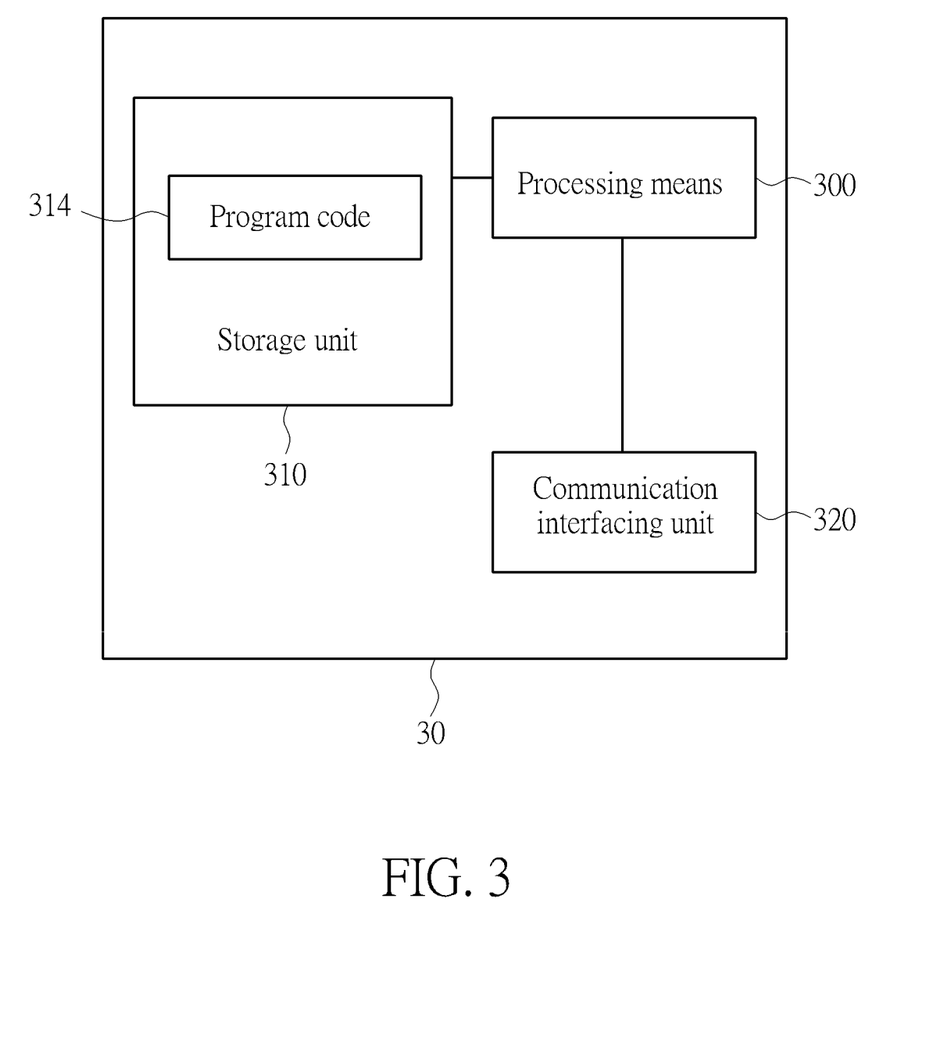
FIG. 3 is a schematic diagram of a communication device according to an example of the present invention.

Please refer to FIG. 3, which is a schematic diagram of a communication device 30 according to an example of the present invention. The communication device 30 can be the UE shown in FIGS. 1 and 2. The communication device 30 may include a processing means 300 such as a microprocessor or an Application Specific Integrated Circuit (ASIC), a storage unit 310 and a communication interfacing unit 320. The storage unit 310 may be any data storage device that can store a program code 314, accessed by the processing means 300. Examples of the storage unit 310 include but are not limited to a subscriber identity module (SIM), read-only memory (ROM), flash memory, random-access memory (RAM), CD-ROM/DVD-ROM, magnetic tape, hard disk, and optical data storage device. The communication interfacing unit 320 is preferably a radio transceiver that can transmit and receive signals (e.g., messages or packets) according to processing results of the processing means 300.

Figure 4:
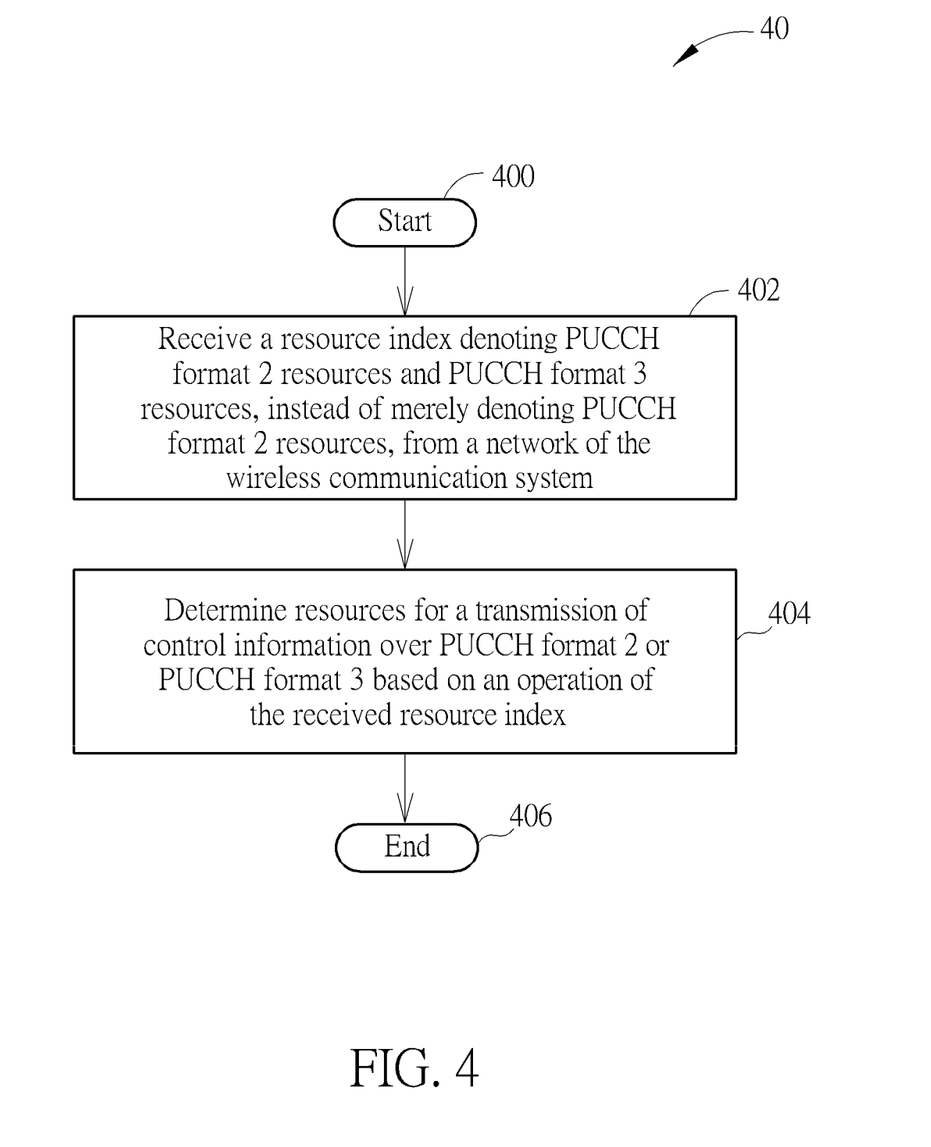
FIG. 4 is a flowchart of a process according to an example of the present invention.

Please refer to FIG. 4, which is a flowchart of a process 40 according to an example of the present invention. The process 40 is utilized for a user equipment to indicate physical uplink control channel (PUCCH) resources for transmission of control information over PUCCH format 3 when the user equipment is configured one cell, such as the serving cell 202 shown in FIG. 2. The user equipment could be the UE in the wireless communication system 10 or the UE 200 in the wireless communication system 20, but is not limited herein. The process 40 may be implemented by the communication device 30 and compiled into the program code 314 to instruct the processing means 300 to execute the following steps:

Step 400: Start.

Step 402: Receive a resource index denoting PUCCH format 2 resources and PUCCH format 3 resources, instead of merely denoting PUCCH format 2 resources, from a network of the wireless communication system.

Step 404: Determine resources for a transmission of control information over PUCCH format 2 or PUCCH format 3 based on an operation of the received resource index.

Step 406: End.

According to the process 40, when the UE is configured one cell (i.e., only one frequency band), the UE receives a resource index (45) $n_{PUCCH}^{(23,\tilde{p})}$, which denotes PUCCH format 2 resources and PUCCH format 3 resources, from the network to replace a resource index used for denoting PUCCH format 2 only. The resource index $n_{PUCCH}^{(23,\tilde{p})}$ may be received via a radio resource control (RRC) signalling. Then, the UE determines whether the received resource index $n_{PUCCH}^{(23,\tilde{p})}$ denotes resources for PUCCH format 2 or PUCCH format 3 by an operation of the received resource index. As a result, resources for PUCCH format 3 can be indicated or identified by the resource index $n_{PUCCH}^{(23,\tilde{p})}$ without changing the specifications currently in effect (i.e. 3GPP Rel-11 or before) too much. In addition, since more number of bits per subframe can be included on PUCCH format 3 resources, the control information transmitted over PUCCH format 3 may comprise more hybrid automatic repeat request (HARQ) feedbacks and/or channel state information (CSI) reports including a precoding matrix indicator (PMI), a channel quality indicator (CQI) or a rank indicator (RI).

The resource index $n_{PUCCH}^{(23,\tilde{p})}$ may be defined in various ways to denote PUCCH format 2 resources and PUCCH format 3 resources. In an example, the UE may calculate a derived resource index $n_{PUCCH}^{(2,\tilde{p})\prime}$ for PUCCH format 2 and utilize PUCCH format 2 for a transmission of control information if a specific criteria is satisfied; otherwise, the UE may calculate a derived resource index $n_{PUCCH}^{(3,\tilde{p})\prime}$ for PUCCH format 3 and utilize PUCCH format 3 for the transmission of control information. The specific criteria may be satisfied when the received resource index less than a predefined value.

Considering that the range of the resource index $n_{PUCCH}^{(2,\tilde{p})}$ in Rel. 11 is $0 \leq n_{PUCCH}^{(2,\tilde{p})} \leq M-1$ and the range of the resource index $n_{PUCCH}^{(3,\tilde{p})}$ in Rel. 11 is $0 \leq n_{PUCCH}^{(3,\tilde{p})} \leq N-1$, the range of the resource index $n_{PUCCH}^{(23,\tilde{p})}$ may be defined as $0 \leq n_{PUCCH}^{(23,\tilde{p})} \leq M+N-1$. Under this condition, the UE may determine resources for a transmission of control information over PUCCH format 2 or PUCCH format 3 by the following operation:

$$\begin{cases} n_{PUCCH}^{(2,\tilde{p})\prime} = n_{PUCCH}^{(23,\tilde{p})} & \text{if } n_{PUCCH}^{(23,\tilde{p})} \leq M-1 \\ n_{PUCCH}^{(3,\tilde{p})\prime} = n_{PUCCH}^{(23,\tilde{p})} - M & \text{otherwise} \end{cases}$$

where $n_{PUCCH}^{(23,\tilde{p})}$ is the received resource index, $n_{PUCCH}^{(2,\tilde{p})\prime}$ is the derived resource index for PUCCH format 2, $n_{PUCCH}^{(3,\tilde{p})\prime}$ is the another derived resource index for PUCCH format 3, and M is the predefined value.

More specifically, the following shows an example where M=1185, N=550, and thus M+N−1 is 1735. The parameter "CQI-ReportConfig-r12" which includes the parameter "cqi-ReportPeriodic-r12" is set as follows:

```
CQI-ReportConfig-r12 ::= SEQUENCE {
    cqi-ReportPeriodic-r12          CQI-ReportPeriodic-r12   OPTIONAL, -- Need ON
}
``` where the parameter "cqi-ReportPeriodic-r12" is set as:

```
CQI-ReportPeriodic-r12 ::=    CHOICE {
   release                    NULL,
   setup                      SEQUENCE {
      cqi-PUCCH-ResourceIndex-r12      INTEGER (0..1735),
      cqi-PUCCH-ResourceIndexP1-r12    INTEGER (0..1735)    OPTIONAL, -- Need OR
   }
}
```

In this example, both the parameters "cqi-PUCCH-ResourceIndex-r12" and "cqi-PUCCH-ResourceIndexP1-r12" are defined to replace the parameters "cqi-PUCCH-ResourceIndex-r10" and "cqi-PUCCH-ResourceIndexP1-r10", respectively. However, if the parameters "cqi-PUCCH-ResourceIndex-r12" and "cqi-PUCCH-ResourceIndexP1-r12" are not set (or are absent), the parameters "cqi-PUCCH-ResourceIndex-r10", "cqi-PUCCH-ResourceIndexP1-r10" are used instead. Moreover, the resource index $n_{PUCCH}^{(23,\tilde{p})}$, which corresponds to the parameters "cqi-PUCCH-ResourceIndex-r12" and "cqi-PUCCH-ResourceIndexP1-r12", is set such that the derived resource index $n_{PUCCH}^{(2,\tilde{p})\prime}$ and $n_{PUCCH}^{(3,\tilde{p})\prime}$ can be calculated as follows:

$$\begin{cases} n_{PUCCH}^{(2,\tilde{p})\prime} = n_{PUCCH}^{(23,\tilde{p})}, \text{PUCCH format 2 is used} & \text{if } n_{PUCCH}^{(23,\tilde{p})} \leq 1184 \\ n_{PUCCH}^{(3,\tilde{p})\prime} = n_{PUCCH}^{(23,\tilde{p})} - 1185, \text{PUCCH format 3 is used} & \text{otherwise} \end{cases}$$

Noticeably, the process 30 is an example of the present invention. Those skilled in the art should readily make combinations, modifications and/or alterations on the above-mentioned description and examples. For example, the resource index $n_{PUCCH}^{(23,\tilde{p})}$ denoting PUCCH format 2 resources and PUCCH format 3 resources may be defined in a reverse order such that the derived resource index $n_{PUCCH}^{(2,\tilde{p})\prime}$ or $n_{PUCCH}^{(3,\tilde{p})\prime}$ is calculated as follows:

$$\begin{cases} n_{PUCCH}^{(3,\tilde{p})\prime} = n_{PUCCH}^{(23,\tilde{p})}, \text{PUCCH format 3 is used} & \text{if } n_{PUCCH}^{(23,\tilde{p})} \leq 549 \\ n_{PUCCH}^{(2,\tilde{p})\prime} = n_{PUCCH}^{(23,\tilde{p})} - 1185, \text{PUCCH format 2 is used} & \text{otherwise} \end{cases}$$

The resource index $n_{PUCCH}^{(23,\tilde{p})}$ denoting PUCCH format 2 resources and PUCCH format 3 resources may be defined in various manners, such as concatenation, interleaved, addition, multiplication, etc. Therefore, the UE may calculate the derived resource indexes $n_{PUCCH}^{(2,\tilde{p})\prime}$ and $n_{PUCCH}^{(3,\tilde{p})\prime}$ for PUCCH format 2 and format 3 by using various kinds of operations, for example, a separating operation, a multiplying operation, a dividing operation, a modulo operation, or a permutation operation.

Figure 5:
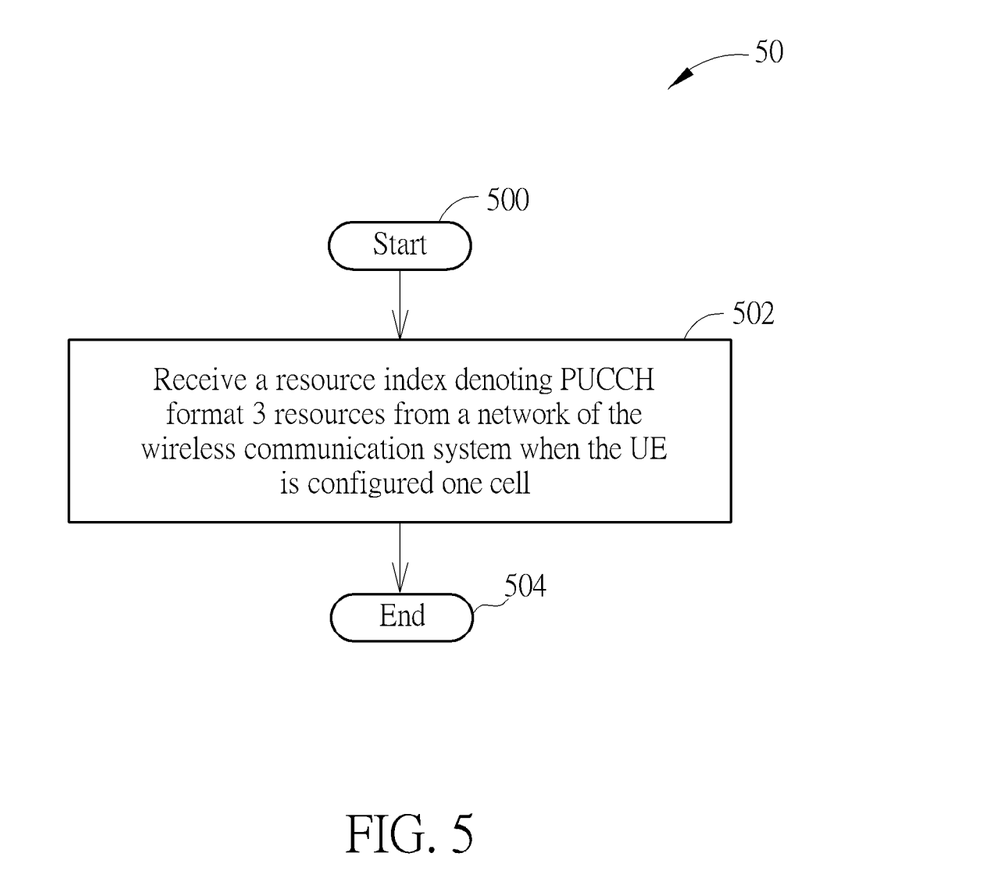
FIG. 5 is a flowchart of a process according to an example of the present invention.

Please refer to FIG. 5, which is a flowchart of a process 50 according to an example of the present invention. The process 50 is utilized for a user equipment to indicate physical uplink control channel (PUCCH) resources for transmission of control information over PUCCH format 3 when the user equipment is configured one cell, such as the serving cell 202 shown in FIG. 2. The user equipment could be the UE in the wireless communication system 10 or the UE 200 in the wireless communication system 20, but is not limited herein. The process 50 may be implemented by the communication device 30 and compiled into the program code 314 to instruct the processing means 300 to execute the following steps:

Step 500: Start.

Step 502: Receive a resource index denoting PUCCH format 3 resources from a network of the wireless communication system when the UE is configured one cell.

Step 504: End.

According to the process 50, when the UE is configured one cell (i.e., only one frequency band), the UE receives a resource index $n_{PUCCH}^{(3,\tilde{p})}$, which denotes PUCCH format 3 resources, from the network. The resource index $n_{PUCCH}^{(3,\tilde{p})}$ may be received via a radio resource control (RRC) signalling. In contrast to the prior art where the PUCCH format 3 is used only when the UE is configured multiple cells, in the present invention, a resource index $n_{PUCCH}^{(3,\tilde{p})}$ is introduced into RRC signaling when the UE is configured only one cell to determine the resources used for PUCCH format 3. Since more number of bits per subframe can be included on PUCCH format 3 resources, the control information transmitted over PUCCH format 3 may comprise more hybrid automatic repeat request (HARQ) feedbacks and/or channel state information (CSI) reports including a precoding matrix indicator (PMI), a channel quality indicator (CQI) or a rank indicator (RI).

To determine the resource index $n_{PUCCH}^{(3,\tilde{p})}$, an additional parameter "CQI-ReportConfig-r12" is set as follows:

```
CQI-ReportConfig-r12 ::= SEQUENCE {
   cqi-ReportPeriodic-r12       CQI-ReportPeriodic-r12   OPTIONAL, -- Need ON
}
``` where the parameter "cqi-ReportPeriodic-r12" included in the parameter "CQI-ReportConfig-r12" is set as:

```
CQI-ReportPeriodic-r12 ::=    CHOICE {
   release                    NULL,
   setup                      SEQUENCE {
      cqi-n3PUCCH-ResourceIndex-r12      INTEGER (0..549),
      cqi-n3PUCCH-ResourceIndexP1-r12    INTEGER (0..549)   OPTIONAL, -- Need OR
   }
}
```

Note that the above examples for the processes 40 and 50 apply to the wireless communication system 10 or 20 in which both the transmitter and the receiver (i.e. the UE and the serving cell) employ two antennas. If the UE and the serving cell employ different amount of antennas to communicate with each other, appropriate modifications to the parameters are required.

The abovementioned steps of the processes 40 and 50 including suggested steps may be realized by means of hardware, software, firmware, or an electronic system. Examples of hardware may include analog, digital and mixed circuits known as microcircuit, microchip, or silicon chip. Examples of the electronic system may include a system on chip (SOC), system in package (SiP), a computer on module (COM), and the communication device 30.

In the prior art, the PUCCH format 3 is used only when the UE is configured multiple cells (i.e. multiple frequency bands). When the UE is configured one cell, the UE does not receive any signalling for PUCCH format 3 resources. By contrast, the present invention utilizes PUCCH format 3 for CSI reports and/or HARQ feedbacks transmission when the UE is configured one cell. In this way, the UE can transmit more bits of CSI reports on resources, so as to support the requirement of wireless communication system featuring finer spatial and frequency granularity such as an enhanced MIMO system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of indicating physical uplink control channel (PUCCH) resources for a user equipment (UE) of a wireless communication system, the method comprising:
    receiving a resource index denoting both PUCCH format 2 resources and PUCCH format 3 resources from a network of the wireless communication system when being configured to only one cell; and
    determining resources for a transmission of control information over PUCCH format 2 or PUCCH format 3 based on an operation of the received resource index.

2. The method of claim 1, wherein the control information transmitted over PUCCH format 3 comprises a channel state information (CSI) report or a CSI report plus a hybrid automatic repeat request (HARQ) feedback.

3. The method of claim 1, wherein the step of determining resources for the transmission of control information over PUCCH format 2 or PUCCH format 3 based on the operation of the received resource index comprises:
    calculating a derived resource index for PUCCH format 2 and utilizing PUCCH format 2 for the transmission of control information if a specific criteria is satisfied; and
    calculating another derived resource index for PUCCH format 3 and utilizing PUCCH format 3 for the transmission of control information otherwise.

4. The method of claim 3, wherein the specific criteria is satisfied when the received resource index less than a predefined value.

5. The method of claim 4, wherein the derived resource index for PUCCH format 2 and the another derived resource index for PUCCH format 3 are given by the following equation:

$$\begin{cases} n_{PUCCH}^{(2,\tilde{p})\prime} = n_{PUCCH}^{(23,\tilde{p})} & \text{if } n_{PUCCH}^{(23,\tilde{p})} \leq M - 1 \\ n_{PUCCH}^{(3,\tilde{p})\prime} = n_{PUCCH}^{(23,\tilde{p})} - M & \text{otherwise} \end{cases}$$

where $n_{PUCCH}^{(23,\tilde{p})}$ is the received resource index, $n_{PUCCH}^{(2,\tilde{p})\prime}$ is the derived resource index for PUCCH format 2, $n_{PUCCH}^{(3,\tilde{p})\prime}$ is the another derived resource index for PUCCH format 3, and M is the predefined value.

6. The method of claim 1, wherein the operation comprises a separating operation, a multiplying operation, a dividing operation, a modulo operation, or a permutation operation.

7. A method of indicating physical uplink control channel (PUCCH) resources for a user equipment (UE) of a wireless communication system, the method comprising:
    receiving a resource index denoting PUCCH format 3 resources from a network of the wireless communication system when the UE is configured only one cell; and
    transmitting control information according to the resource index denoting PUCCH format 3.

8. The method of claim 7, wherein the control information transmitted over PUCCH format 3 comprises a channel state information (CSI) report and a hybrid automatic repeat request (HARQ) feedback.

9. The method of claim 7, wherein the resource index is received via a radio resource control (RRC) signalling.

10. A communication device of indicating physical uplink control channel (PUCCH) resources in a wireless communication system, the communication device comprising:
    a processing means;
    a storage unit; and
    a program code, stored in the storage unit, wherein the program code instructs the processing unit to execute the following steps:
        receiving a resource index denoting both PUCCH format 2 resources and PUCCH format 3 resources from a network of the wireless communication system when being configured to only one cell; and
        determining resources for a transmission of control information over PUCCH format 2 or PUCCH format 3 based on an operation of the received resource index.

11. The communication device of claim 10, wherein the control information transmitted over PUCCH format 3 comprises a channel state information (CSI) report or a CSI report plus a hybrid automatic repeat request (HARQ) feedback.

12. The communication device of claim 10, wherein the step of indicating resources for the transmission of control information over PUCCH format 2 or PUCCH format 3 based on the operation of the received resource index comprises:
    calculating a derived resource index for PUCCH format 2 and utilizing PUCCH format 2 for the transmission of control information if a specific criteria is satisfied; and
    calculating another derived resource index for PUCCH format 3 and utilizing PUCCH format 3 for the transmission of control information otherwise.

13. The communication device of claim 12, wherein the specific criteria is satisfied when the received resource index less than a predefined value.

14. The communication device of claim 13, wherein the derived resource index for PUCCH format 2 and the another derived resource index for PUCCH format 3 are given by the following equation:

$$\begin{cases} n_{PUCCH}^{(2,\tilde{p})\prime} = n_{PUCCH}^{(23,\tilde{p})} & \text{if } n_{PUCCH}^{(23,\tilde{p})} \le M-1 \\ n_{PUCCH}^{(3,\tilde{p})\prime} = n_{PUCCH}^{(23,\tilde{p})} - M & \text{otherwise} \end{cases}$$

where $n_{PUCCH}^{(23,\tilde{p})}$ is the received resource index, $n_{PUCCH}^{(2,\tilde{p})\prime}$ is the derived resource index for PUCCH format 2, $n_{PUCCH}^{(3,\tilde{p})\prime}$ is the another derived resource index for PUCCH format 3, and M is the predefined value.

15. The communication device of claim 10, wherein the operation comprises a separating operation, a multiplying operation, a dividing operation, a modulo operation, or a permutation operation.

16. A communication device of indicating physical uplink control channel (PUCCH) resources in a wireless communication system, the communication device comprising:
 a processing means;
 a storage unit; and
 a program code, stored in the storage unit, wherein the program code instructs the processing unit to execute the following steps:
  receiving a resource index denoting PUCCH format 3 resources from a network of the wireless communication system when the communication device is configured only one cell.

17. The communication device of claim 16, wherein the control information transmitted over PUCCH format 3 comprises a channel state information (CSI) report and a hybrid automatic repeat request (HARQ) feedback.

18. The communication device of claim 16, wherein the resource index is received via a radio resource control (RRC) signalling.

* * * * *